(12) United States Patent
Frey et al.

(10) Patent No.: US 9,684,520 B2
(45) Date of Patent: Jun. 20, 2017

(54) COMPUTING SYSTEM WITH NON-DISRUPTIVE FAST MEMORY RESTORE MECHANISM AND METHOD OF OPERATION THEREOF

(75) Inventors: Robert Tower Frey, Milpitas, CA (US); Joshua Harris Brooks, Alameda, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 1614 days.

(21) Appl. No.: 13/277,720

(22) Filed: Oct. 20, 2011

(65) Prior Publication Data

US 2013/0103887 A1 Apr. 25, 2013

(51) Int. Cl.
G06F 12/02 (2006.01)
G06F 9/44 (2006.01)
G06F 11/14 (2006.01)

(52) U.S. Cl.
CPC .......... G06F 9/442 (2013.01); G06F 11/1441 (2013.01)

(58) Field of Classification Search
CPC .............................. G06F 9/442; G06F 11/1441
USPC .... 711/162, 105, 106, 154, 156, 160; 713/1, 713/2, 330, 340
See application file for complete search history.

(56) References Cited

U.S. PATENT DOCUMENTS

| | | | |
|---|---|---|---|
| 5,724,365 A * | 3/1998 | Hsia | G11C 29/10 365/201 |
| 5,799,200 A | 8/1998 | Brant et al. | |
| 5,819,087 A * | 10/1998 | Le et al. | 713/2 |
| 6,336,174 B1 | 1/2002 | Li et al. | |
| 6,473,843 B2 * | 10/2002 | Abramson et al. | 711/162 |
| 7,412,559 B2 * | 8/2008 | Stockdale et al. | 711/103 |
| 7,688,661 B2 | 3/2010 | Fujioka et al. | |
| 7,830,732 B2 | 11/2010 | Moshayedi et al. | |
| 8,078,858 B2 * | 12/2011 | Herzi | G06F 11/2284 713/1 |
| 8,495,423 B2 * | 7/2013 | Frost et al. | 714/24 |
| 8,508,996 B2 * | 8/2013 | Kim et al. | 365/185.17 |
| 8,595,413 B2 * | 11/2013 | Shima et al. | 711/103 |
| 2004/0073761 A1 * | 4/2004 | Kato | G06F 9/4403 711/165 |
| 2007/0288692 A1 * | 12/2007 | Bruce | G06F 3/061 711/113 |
| 2010/0008175 A1 * | 1/2010 | Sweere | G06F 12/0866 365/229 |

* cited by examiner

Primary Examiner — Stephen Elmore
(74) Attorney, Agent, or Firm — Wong & Rees LLP

(57) ABSTRACT

A method for operating a computing system includes: monitoring a central interface for a power event; accessing a high-speed memory for pre-shutdown data; accessing a non-volatile memory during the power event for the pre-shutdown data previously stored on the high-speed memory; selecting a multiplexer for allowing external access to the high-speed memory; and formatting the pre-shutdown data in the non-volatile memory for access through a non-disruptive interface.

18 Claims, 3 Drawing Sheets

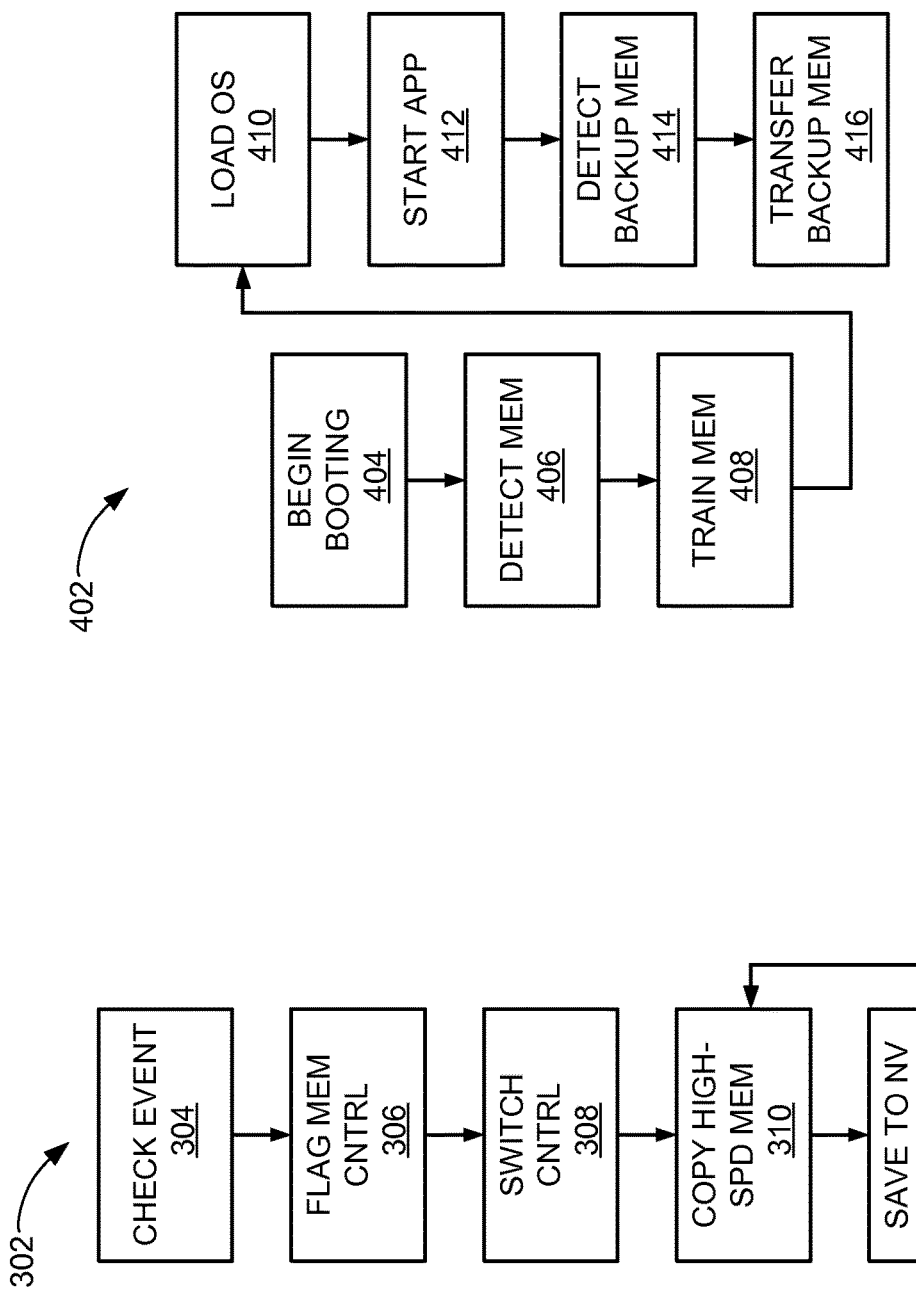

COMPUTING SYSTEM WITH NON-DISRUPTIVE FAST MEMORY RESTORE MECHANISM AND METHOD OF OPERATION THEREOF

TECHNICAL FIELD

The present invention relates generally to a computing system, and more particularly to a computing system with non-disruptive restore of the fast memory.

BACKGROUND ART

Contemporary high performance computing main fast-memory systems are generally composed of one or more memory devices, such as dual in-line memory modules (DIMMs), which are connected to one or more memory controllers and/or processors. The DIMMs may be connected via one or more memory interface elements such as hubs, bus-to-bus converters, etc. The memory devices are generally located in a memory subsystem and are often connected via a pluggable interconnection system by one or more connectors to a system board, such as a PC motherboard.

Overall computer system performance is affected by each of the key elements of the computer structure, including the performance/structure of the processor, any memory caches, the input/output (I/O) subsystem, the efficiency of the memory control functions, the performance of the main memory devices, any associated memory interface elements, and the type and structure of the memory interconnect interface. Extensive research and development efforts are invested by the industry, on an ongoing basis, to create improved and innovative solutions to maximizing overall system performance and density by improving the fast-memory system design.

Currently, many computer systems use dynamic random access memory (DRAM) during the operation of the system. The DRAM offers relatively quick access to data but does not retain the data once the power is removed. Due to the inability of the DRAM to retain data, the computer system must store the data before the system shuts off and restore the data when the system restarts.

Thus, a need still remains for non-volatile fast-memory system with non-disruptive restore that can reliably and efficiently restore the data to the DRAM. In view of the increasing reliance on computer data structures, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method for operating a computing system including: monitoring a central interface for a power event; accessing a high-speed memory for pre-shutdown data; accessing a non-volatile memory during the power event for the pre-shutdown data previously stored on the high-speed memory; selecting a multiplexer for allowing external access to the high-speed memory; and formatting the pre-shutdown data in the non-volatile memory for access through a non-disruptive interface.

The present invention provides a computing system, including: an event detector coupled to a central interface, with the event detector for monitoring the central interface for a power event; a multiplexer, coupled to the central interface, for accessing a high-speed memory for pre-shutdown data; a memory controller, coupled to the multiplexer, for accessing a non-volatile memory during the power event for the pre-shutdown data previously stored on the high-speed memory, and the memory controller having: an on-sequence module for selecting the multiplexer to allow external access to the high-speed memory, and a format module for formatting the pre-shutdown data in the non-volatile memory for access through a non-disruptive interface.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF THE DRAWINGS

FIG. 3 is an operational flowchart of a power-off sequence of the fast-memory of FIG. 1.

FIG. 4 is an operational flowchart of a power-on sequence of the fast-memory of FIG. 1.

BEST MODE FOR CARRYING OUT THE INVENTION

Figure 1:
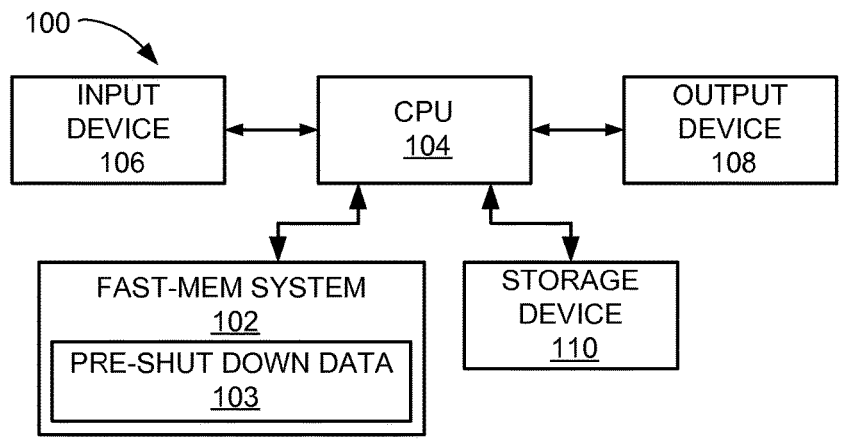
FIG. 1 is a functional block diagram of a computing system with non-disruptive restore mechanism in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Similarly, although the views in the drawings for ease of description generally show similar orientations, this depiction in the FIGs. is arbitrary for the most part. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals.

The term "module" referred to herein can include software, hardware, or a combination thereof in the context used herein. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes assembling data structures, transferring data structures to peripheral storage devices, manipulating data structures, and reading data structures from external sources. Data structures are defined to be files, input data, system generated data, such as calculated data, and program data.

Referring now to FIG. 1, therein is shown a functional block diagram of a computing system 100 with non-disruptive restore mechanism in an embodiment of the present invention. The computing system 100, such as a desktop computer or a smart phone, can also have a fast-memory 102 a central processing unit 104 (CPU), an input device 106, an output device 108, and a storage device 110, such as a solid state drive or a hard-disc drive. The fast-memory 102 can be coupled to the central processing unit 104. The central processing unit 104 can be coupled to the input device 106, the output device 108, and the storage device 110.

The fast-memory 102 is defined as a device for holding data that can be accessed in any order or in bursts for use during the operation of the computing system 100. For example, the fast-memory 102 can be random access memory (RAM), such as data rate synchronous dynamic RAM (DDR SDRAM). Also, for example, the fast-memory 102 can have a dual-input memory module (DIMM) package and have volatile or non-volatile memory components or both, such as in non-volatile DIMM (NVDIMM).

The fast-memory 102 can have pre-shutdown data 103. The pre-shutdown data 103 is defined as data that is or was on the data prior to the computer system 100 stops operating. For example, the pre-shutdown data 103 can be the information on the RAM immediately before the computer system 100 shuts down or hangs up. Also, for example, the pre-shutdown data 103 can be the sequence of bits stored on the non-volatile portion of the NVDIMM.

The central processing unit 104 is defined as a device for calculating and processing data. The central processing unit 104 can include a control unit, not shown, and an algorithm and logic unit, not shown. For example, the central processing unit 104 can be Intel™ Pentium™ processor or a digital signal processing chip in a cellular phone.

The central processing unit 104 can access the fast-memory 102. The central processing unit 104 can access the fast-memory 102 by reading the data on the fast-memory 102, writing to the fast-memory 102 or processing the data that is on the fast-memory 102.

The central processing unit 104 can also perform a series of reads and writes to transfer the data within the fast-memory 102. The central processing unit 104 can read the data from one location within the fast-memory 102, write the data into another location within the fast-memory 102. The data in the original location within the fast-memory 102 can be erased or preserved. The central processing unit 104 can perform similar steps to transfer the data between the fast-memory 102 to an external device, such as an external hard drive or a network device, through the input device 106, the output device 108, or a combination thereof.

The central processing unit 104 can also perform a series of functions to train and initialize the fast-memory 102. When power is applied to the computer or when the computing system 100 resets, the central processing unit 104 can adjust the timing required to access the data on the fast-memory 102. The training process can also include a series of writes and reads at predetermined rates increasing in write speed.

The central processing unit 104 can finish the training process and continue to write to the fast-memory 102 at the fastest write speed that the central processing unit 104 successfully confirmed. The central processing unit 104 can finish the initialization process by completing the training of the fast-memory 102 and loading a predetermined set of data on to the fast-memory 102 or a portion thereof. A detailed description of the interaction between the central processing unit 104 and the fast-memory 102 will be discussed below.

The central processing unit 104 can also access and process the pre-shutdown data 103 stored in the fast-memory system 102. The details regarding the access of the pre-shutdown data 103 will be discussed in detail below.

The input device 106 is defined as a device for inputting data into the central processing unit 104. For example, the input device 106 can be a keyboard, mouse, or a scanner. The output device 108 is defined as a device for outputting data from the central processing unit 104. For example, the output device 108 can be a computer monitor, a television, or a printer. In other embodiments, the input device 106 and the output device 108 can be combined into one device, such as a touchscreen display.

A user (not shown) can input the data to be processed or stored into the computing system 100 using the input device 106. The central processing unit 104 can receive the inputted data and calculate or process the data. The resulting output data can be stored in the fast-memory 102, or the central processing unit 104 can output the resulting data to the output device 108.

Figure 2:
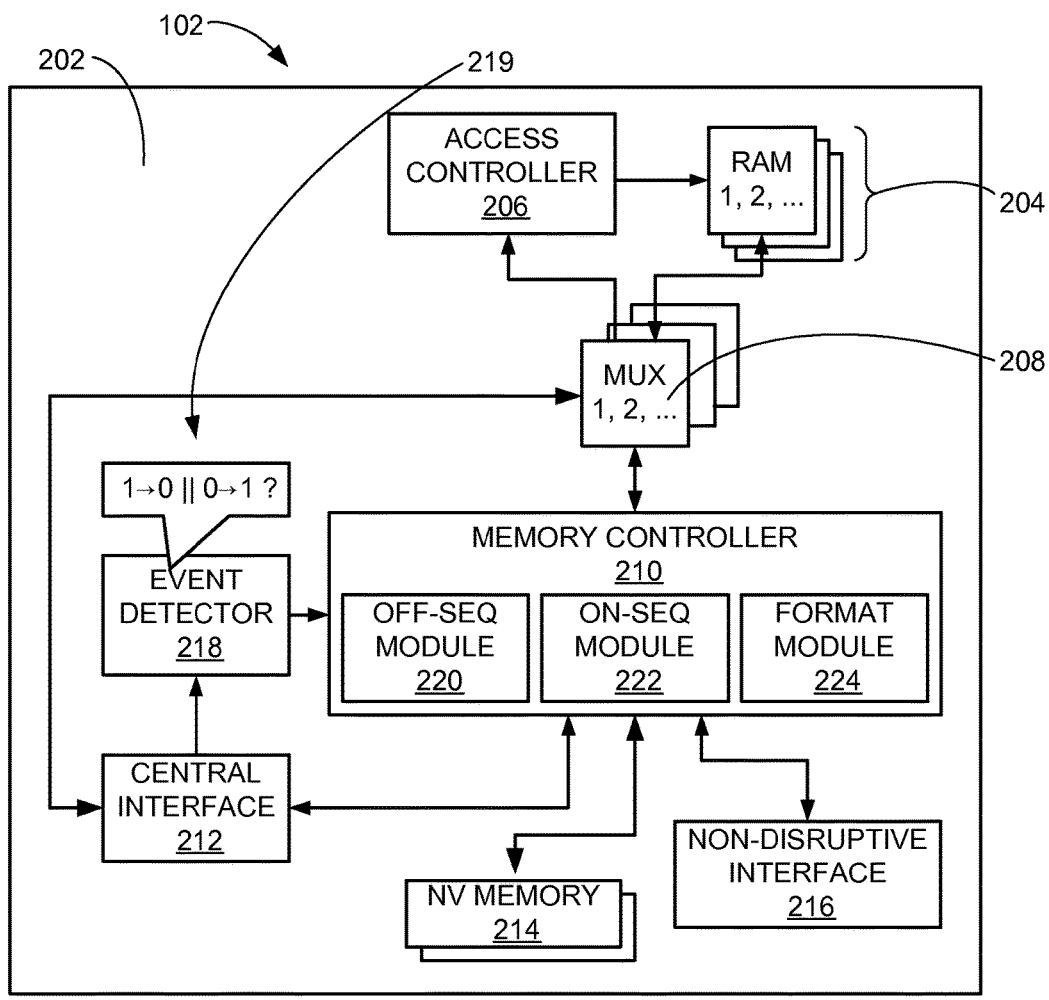
FIG. 2 is a functional block diagram of the fast-memory of the computing system of FIG. 1.

Referring now to FIG. 2, therein is shown a functional block diagram of the fast-memory 102 of the computing system 100 of FIG. 1. The functional block diagram of the fast-memory 102 depicts a carrier 202, such as a printed circuit board, having high-speed memory 204. The high-speed memory 204 is defined as one or more volatile memory modules for holding the data necessary during processing, such as DRAM that lose data when power is removed.

An access controller 206 can be coupled to the high-speed memory 204. The access controller 206 is defined as a device that controls reading from and writing to the high-speed memory 204. For example, the access controller 206 can be a hardware register that buffers the control signals in a registered DIMM module. Also, for example, the access controller 206 can be a module ensuring timing accuracy of the various signals through phase-locked loops in DDR SDRAM modules.

The access controller 206 can control the read and write operations by adjusting the pulse shape and timing for clock and data signals to be within a predefined range of values. The access controller 206 can also control the read and write operations by setting the pulse edges for each bit of the data.

A multiplexer 208 can be coupled to the access controller 206 and the high-speed memory 204. The multiplexer 208 can also be coupled to a memory controller 210 and a central interface 212. The multiplexer 208 is defined as a device for accessing the high-speed memory 204. The multiplexer 208 can allow access, such as read or write, to the contents of the high-speed memory 204.

The multiplexer 208 can allow the central processing unit 104 of FIG. 1 or the memory controller 210 to access the high-speed memory 204. The multiplexer 208 can be designed so that only one of the two can access the high-speed memory 204 at a time and not both simultaneously.

The multiplexer 208 can allow access by routing signal lines, such as data, address, command, or clock lines, between the high-speed memory 204 and the memory controller 210 or between the high-speed memory 204 and the central interface 212. It is to be understood that the data lines can be bi-directional and the address, command, and clock lines are unidirectional to the multiplexer 208.

The memory controller 210 is defined as a device for controlling the overall operation of the fast-memory 102 during system initialization or system shut-down process of the computing system 100 of FIG. 1. The memory controller 210 can be implemented as a field programmable gate array (FPGA), not shown, or an application specific integrated circuit (ASIC), not shown, that stores and executes the instructions for controlling the fast-memory 102. The memory controller 210 can also have various interfaces, not shown, for controlling other modules. The details regarding the operation of the memory controller 210 will be discussed below.

The central interface 212 can be coupled to the memory controller 210 and the multiplexer 208. The central interface 212 is defined as the interface for interacting with the central processing unit 104. For example, the central interface 212 can be used to communicate data, commands, clock signals, or a combination thereof between the central processing unit 104 and the high-speed memory 204 through the multiplexer 208.

A non-volatile memory 214 can be coupled to the memory controller 210. The non-volatile memory 214 can include a number of memory chips having a sufficient capacity to store all of the data from the high-speed memory 204 and the memory chips can retain data without power applied to the memory chips. The non-volatile memory 214 can be formatted to have more parallel data bits than the high-speed memory 204. This is a speed matching technique used in conjunction with a reduction in speed of the high-speed memory 204.

A non-disruptive interface 216 can be coupled to the non-volatile memory 214 through the memory controller 210. In another example, the memory controller 210 can have the non-disruptive interface 216. The non-disruptive interface 216 is defined as an interface for allowing the central processing unit 104 to access the non-volatile memory 214.

For example, the non-disruptive interface 216 can be universal serial bus (USB) interface or serial advanced technology attachment (SATA) interface. Also, for example, the non-disruptive interface 216 can be Inter-Integrated Circuit (I2C) interface, serial attached SCSI (SAS), or fiber channel (FC) interface.

An event detector 218 can be coupled to the central interface 212 and the memory controller 210. The event detector 218 is defined as a device for monitoring the central interface 212 for a power event 219. The event detector 218 can detect the power event 219, such as a predefined set of conditions for the system input power or system status, through the central interface 212.

For example, the event detector 218 can detect when the power is first applied or removed. The event detector 218 can detect the power status by measuring the input power to the computing system 100 of FIG. 1 or by receiving a control or status signal from the central processing unit 104. Also, for example, the event detector 218 can detect when the computing system 100 is resetting or needs to reset through similar methods.

The memory controller 210 can access the high-speed memory 204, the non-volatile memory 214, the non-disruptive interface 216, or a combination thereof during various states of the power event 219. The memory controller 210 can read the pre-shutdown data 103 of FIG. 1 in the high-speed memory 204 and transfer or duplicate the pre-shutdown data 103 to the non-volatile memory 214. The memory controller 210 can also format the pre-shutdown data 103 that was on the high-speed memory 204 so that the pre-shutdown data 103 can be accessible to the central processing unit 104 through the non-disruptive interface 216.

The memory controller 210 can include an off-sequence module 220, an on-sequence module 222, and a format module 224. The off-sequence module 220 is defined as a module that controls the operations of the fast-memory 102 after the event detector 218 detects the power event 219 where the system power goes off. The off-sequence module 220 can have a sequence of steps or processes to write the pre-shutdown data 103 that is on the high-speed memory 204 when the power is removed, to the non-volatile memory 214.

The off-sequence module 220 can signal the multiplexer 208 to send a busy flag to the central processing unit 104 or ignore the instructions of the central processing unit 104. The off-sequence module 220 can access the high-speed memory 204 by reading the contents of the high-speed memory 204 at the time when the power is removed.

The off-sequence module 220 can then transfer the pre-shutdown data 103 from the high-speed memory 204 to the non-volatile memory 214. The off-sequence module 220 can transfer the pre-shutdown data 103 by setting the content of the non-volatile memory 214 to be equal to the pre-shutdown data 103 read from the high-speed memory 204.

The off-sequence module 220 can also manage the transfer of the pre-shutdown data 103 from the high-speed memory 204 to the non-volatile memory 214 when the system power is removed. The off-sequence module 220 can manage the transfer by preserving the interface speed through reading the high-speed memory 204 multiple times to do one write to the non-volatile memory 214.

For example, if the bus width of the high-speed memory 204 is eight bits and the non-volatile memory 214 is 32 bits, the off-sequence module 220 can perform four reads on the high-speed memory 204 for every write to the non-volatile memory 214. The number of reads and writes can be varied based on the size of the memory or the bus width. Thus, the off-sequence module 220 can manage the transfer of the pre-shutdown data 103 and match the speed of the high-speed memory 204 and the non-volatile memory 214.

The on-sequence module 222 is defined as a module that controls the operations of the fast-memory 102 after the event detector 218 detects the power event 219 where the system power comes on. The on-sequence module 222 can have a sequence of steps or processes to avail the pre-shutdown data 103 on the non-volatile memory 214 to the central processing unit 104 through the non-disruptive interface 216.

The on-sequence module 222 can select the multiplexer 208 to allow external access for the central processing unit 104 to the high-speed memory 204 through the central interface 212. The on-sequence module 222 can also read the pre-shutdown data 103 from the non-volatile memory 214 and notify the central processing unit 104 or transfer the pre-shutdown data 103 to the central processing unit 104 or both. The on-sequence module 222 can read the pre-shutdown data 103 in the non-volatile memory while the high-speed memory 204 goes through the training process as part of the system boot process.

The format module 224 is defined as a module for formatting the pre-shutdown data 103 in the non-volatile memory 214 for access through the non-disruptive interface 216. The format module 224 can format the pre-shutdown data 103 by rearranging the pre-shutdown data 103 or adjusting the header or support information of the pre-shutdown data 103 for communicating through different interfaces.

For example, the format module 224 can format the pre-shutdown data 103 to communicate through a USB or SATA interface. Also for example, the format module 224 can format the pre-shutdown data 103 for I2C, SAS, or FC interfaces.

The format module 224 can format the pre-shutdown data 103 after the fast-memory 102 detects the removal of power or after detecting the power come on. The format module 224 can also format the pre-shutdown data 103 before it is saved into the non-volatile memory 214 or format the pre-shutdown data 103 by processing the pre-shutdown data 103 already on the non-volatile memory 214.

The format module 224 can format the pre-shutdown data 103 for the central processing unit 104 to access the pre-shutdown data 103 on the non-volatile memory 214 as part of the sequence of steps during boot process through the non-disruptive interface 216. Thus, the format module 224 can allow the pre-shutdown data 103 that was on the high-speed memory 204 before the computing system 100 shuts down to be restored during power up through an interface other than the central interface 212.

It has been discovered that the present invention provides the computer system 100 for reduced overall system disruptions, hang-ups, and memory resets during system power-on operations. The on-sequence module 222 and the format module 224 reduced overall system disruptions, hang-ups, and memory resets during system power-on by enabling the high-speed memory 204 training process and the memory restoration to proceed through the central interface 212 and the non-disruptive interface 216.

Referring now to FIG. 3, therein is shown an operational flowchart of a power-off sequence 302 of the fast-memory 102 of FIG. 1. The operational flowchart of the power-off sequence 302 depicts a check event block 304, which checks for events or conditions for initiating the power-off sequence 302.

The event detector 218 of FIG. 2 can perform the process in the check event block 304. The event detector 218 can check for events or conditions by monitoring the system input power for the power event 219 of FIG. 2. The event detector 218 detects the power-off sequence 302 when the power event 219 occurs, such as when the system input power falls below a threshold voltage. The event detector 218 can thus detect an abnormal power failure, such as black out or power supply failure, and initiate the power-off sequence 302.

The event detector 218 can also check for the power event 219, such as control signals from the central processing unit 104 of FIG. 1 coming through the central interface 212 of FIG. 2. The central processing unit 104 can set a flag or send a signal to the event detector 218 when the user initiates a normal shut-down procedure. The event detector 218 can receive or read the signal or flag and initiate the power-off sequence 302.

The event detector 218 can further check for the power event 219 by checking heartbeat signals or clock signals from the central processing unit 104 coming through the central interface 212. The central processing unit 104 can send a periodic clock signal to the event detector 218. The event detector 218 can initiate the power-off sequence 302 when the patterned signal deviates beyond a threshold range, such as when the central processing unit 104 encounters a failure.

The flow proceeds to a flag memory control block 306. The event detector 218 can perform the process in the flag memory control block 306. The event detector 218 can initiate the power-off sequence 302 by setting a flag in or sending a signal to the memory controller 210 of FIG. 2.

The flow proceeds to a switch control block 308. The memory controller 210 can perform the process in the switch control block 308.

Upon receiving a flag or signal from the event detector 218, the off-sequence module 220 of FIG. 2 of the memory controller 210 can send a signal to or set a flag for the memory controller 210 to take control over the high-speed memory 204 of FIG. 2. The multiplexer 208 of FIG. 2 can be configured to ignore the central processing unit 104 when the memory controller 210 takes control or send a busy signal to the central processing unit 104. Generally, the central processing unit 104 relinquishes control over the multiplexer 208 when conditions for initiating the power-off sequence 302 are satisfied.

The flow proceeds to a copy high speed memory block 310. The off-sequence module 220 can perform the process in the copy high speed memory block 310. The off-sequence module 220 can access the high-speed memory 204 through the multiplexer 208. The off-sequence module 220 access the pre-shutdown data 103 stored in the high-speed memory 204 by reading the pre-shutdown data 103 stored in the high-speed memory 204.

The flow proceeds to a save to non-volatile memory block 312. The off-sequence module 220 can perform the process of the save to non-volatile memory block 312. The off-sequence module 220 can access the non-volatile memory 214 of FIG. 2 by writing to the non-volatile memory.

The off-sequence module 220 can save to the non-volatile memory 214 by setting the contents of the non-volatile memory 214 to values equal to the pre-shutdown data 103 read from the high-speed memory 204. The off-sequence module 220 can repeat the process until the desired portion of the pre-shutdown data 103 on the high-speed memory 204 is duplicated on the non-volatile memory 214. Thus, the fast-memory 102 can transfer the contents in dynamic memory into non-volatile memory during the power-off sequence 302 to preserve the pre-shutdown data 103.

The off-sequence module 220 can also manage the transfer of the pre-shutdown data 103 from the high-speed memory 204 to the non-volatile memory 214 during the save process. The off-sequence module 220 can manage the transfer by preserving the interface speed through reading the high-speed memory 204 multiple times to do one write to the non-volatile memory 214. The off-sequence module 220 can match the speed of the high-speed memory 204 and the non-volatile memory 214 as described above.

During the save process, the format module 224 of FIG. 2 can format the pre-shutdown data 103. The format module 224 can format the pre-shutdown data 103 after the power-off sequence 302 has been detected and before writing to the non-volatile memory 214. The format module 224 can also process the pre-shutdown data 103 stored in the non-volatile memory 214 to format the pre-shutdown data 103.

The format module 224 can format the pre-shutdown data 103 by rearranging the pre-shutdown data 103, modifying the header or support information for the pre-shutdown data 103, or a combination thereof. The format module 224 can format the pre-shutdown data 103 during the save step so that the pre-shutdown data 103 can be transferred to the central processing unit 104 through the non-disruptive interface 216 of FIG. 2. For example, the format module 224 can format the pre-shutdown data 103 in preparation for communicating through a USB interface or a SATA interface.

During normal conditions, before the power-off sequence 302 initiates, the central processing unit 104 can directly access the high-speed memory 204 through the central interface 212 and the multiplexer 208. The on-sequence module 222 can select the multiplexer 208 to allow external access to the high-speed memory 204, for the central processing unit 104 to directly access the high-speed memory 204 before the power-off sequence 302 initiates. Also during normal conditions, the memory controller 210 can remain inactive and allow the central processing unit 104 to access and control the high-speed memory 204.

Referring now to FIG. 4, therein is shown an operational flowchart of a power-on sequence 402 of the fast-memory 102 of FIG. 1. The operational flowchart of the power-on sequence 402 depicts a begin booting block 404, which initiates as soon as power is applied to the computing system 100 of FIG. 1 is started. The central processing unit 104 of FIG. 1 can perform the process of the begin booting block 404.

The central processing unit 104 of can perform the system initialization process. The central processing unit 104 can access the firmware for booting instructions loaded in various places. The booting instructions, such as the basic input/output system (BIOS) or extensible firmware interface (EFI), can be stored on the central processing unit 104, a separate boot device, a section within the fast-memory 102, or a combination thereof. The central processing unit 104 can initialize and identify system devices, including the input device 106 of FIG. 1, the output device 108 of FIG. 1, and other peripheral devices.

The flow proceeds to a detect memory block 406. The central processing unit 104 can perform the process of the detect memory block 406. During the system initialization process, the central processing unit 104 can detect the fast-memory 102. Detecting the fast-memory 102 can include identifying the fast-memory 102 and locating the address of the fast-memory 102.

Also during the system initialization process, the event detector 218 of FIG. 2 can detect the power-on sequence 402 by detecting that the system power has been applied. When the power-on sequence 402 is detected, the on-sequence module 222 of FIG. 2 can select the multiplexer 208 of FIG. 2 to allow external access to the high-speed memory 204 of FIG. 2. The on-sequence module 222 can set a bit or a flag or remain inactive to allow the central processing unit 104 to directly access the high-speed memory 204 through the central interface 212 of FIG. 2.

Further, after detecting the power-on sequence 402, the format module 224 can format the contents of the non-volatile memory 214 of FIG. 2 to communicate through the non-disruptive interface 216 of FIG. 2. The process for formatting the pre-shutdown data 103 has been described above.

The flow proceeds to a train memory block 408. The central processing unit 104 and the motherboard (not shown) can perform the process of the train memory block 408.

Once the central processing unit 104 detects the fast-memory 102, the central processing unit 104 and the motherboard can train the fast-memory 102. For example, the central processing unit 104, through the motherboard, can train the high-speed memory 204 during the system initialization process. The process of training and initializing the fast-memory 102 has been described above.

The flow proceeds to a load operating system block 410. The central processing unit 104 can perform the process of the load operating system block 410. The central processing unit 104 can continue with the booting process to load the operating system stored on the fast-memory 102. For example, the central processing unit 104 can load the operating system, such as firmware or Microsoft Windows™ stored on a predetermined address on a disc drive.

The flow proceeds to a start application block 412. The central processing unit 104 can perform the process of the start application block 412. Once the operating system has loaded, the central processing unit 104 can initiate applications or software programs, as an example.

The flow proceeds to a detect backed-up memory block 414. The fast-memory 102, the central processing unit 104, or a combination thereof can perform the operations of the detect backed-up memory block 414.

The fast-memory 102, the central processing unit 104, or a combination thereof can detect pre-shutdown data 103 on the fast-memory 102 that the application was using prior to the power-off sequence 302 of FIG. 3. The application can check the pre-shutdown data 103 or portions of the pre-shutdown data 103, such as the header information or specific data portions, for predetermined patterns to detect the pre-shutdown data 103 that was backed up during the power-off sequence 302.

The application can detect the backed up memory through the central processing unit 104 and the on-sequence module 222 of FIG. 2. For example, application can detect the backed up memory by the on-sequence module 222 setting a flag or sending a signal to the central processing unit 104 through the non-disruptive interface 216. Also, for example, application can detect the backed up memory with the central processing unit 104 checking the contents of the non-volatile memory 214 through the non-disruptive interface 216.

The flow proceeds to a transfer backed-up memory block 416. The central processing unit 104 through the non-disruptive interface 316, the memory controller 210, or a combination thereof can perform the process of the transfer backed-up memory block 416.

The central processing unit 104, through the non-disruptive interface 216, can access the pre-shutdown data 103 that was backed up. The central processing unit 104 can read the pre-shutdown data 103 on the non-volatile memory 214 through the non-disruptive interface 216.

The central processing unit 104 can transfer the pre-shutdown data 103 by setting the values of the high-speed memory 204 to be the same as the contents of the non-volatile memory 214. The central processing unit 104 can also transfer the pre-shutdown data 103 by using the read values to calculate or process according the application. The connection to and control over the high-speed memory 204 through the central interface 212 is undisturbed during the transfer.

During system power-on, the central processing unit 104 and the system motherboard, not shown, can perform training and initialization of the high-speed memory 204 as described above. After the training and initialization process is finished or during the processes, the CPU can access contents of the pre-shutdown data 103 previously on the high-speed memory 204 prior to the power-off sequence 302 through the non-disruptive interface 216. Accessing the pre-shutdown data 103 directly through the non-disruptive interface 216 eliminates the need for the CPU to switch the memory bus from the high-speed memory 204 to the memory controller 210 of FIG. 2.

It will be understood by those having ordinary skill in the art that the above described hardware may detect system power down or system fault conditions in order to initiate a total memory back-up process. During the total memory back-up process the contents of the high-speed memory 204 are stored in the non-volatile memory 214.

It has been discovered that the present invention provides the computer system 100 with reduced overall system disruptions, hang-ups, or memory resetting during system power-on operations. The combination of the non-disruptive interface 216 coupled to the non-volatile memory 214, the central processing unit 104, and the central interface 212 gives rise to reduced overall system disruptions, hang-ups, or memory resetting during system power-on operation by allowing the central processing unit 104 to maintain electrical connectivity with the high-speed memory 204 after the training and initialization process and still access the pre-shutdown data 103 in the non-volatile memory 214.

It has further been discovered that the present invention provides the fast-memory 102 that eliminate loss of wanted data during system power-on operations. The non-disruptive interfaces 216 eliminates loss of wanted data during system power-on operations by eliminating the possibility of the training and initialization process overwriting data prematurely transferred to the high-speed memory 204.

Figure 5:
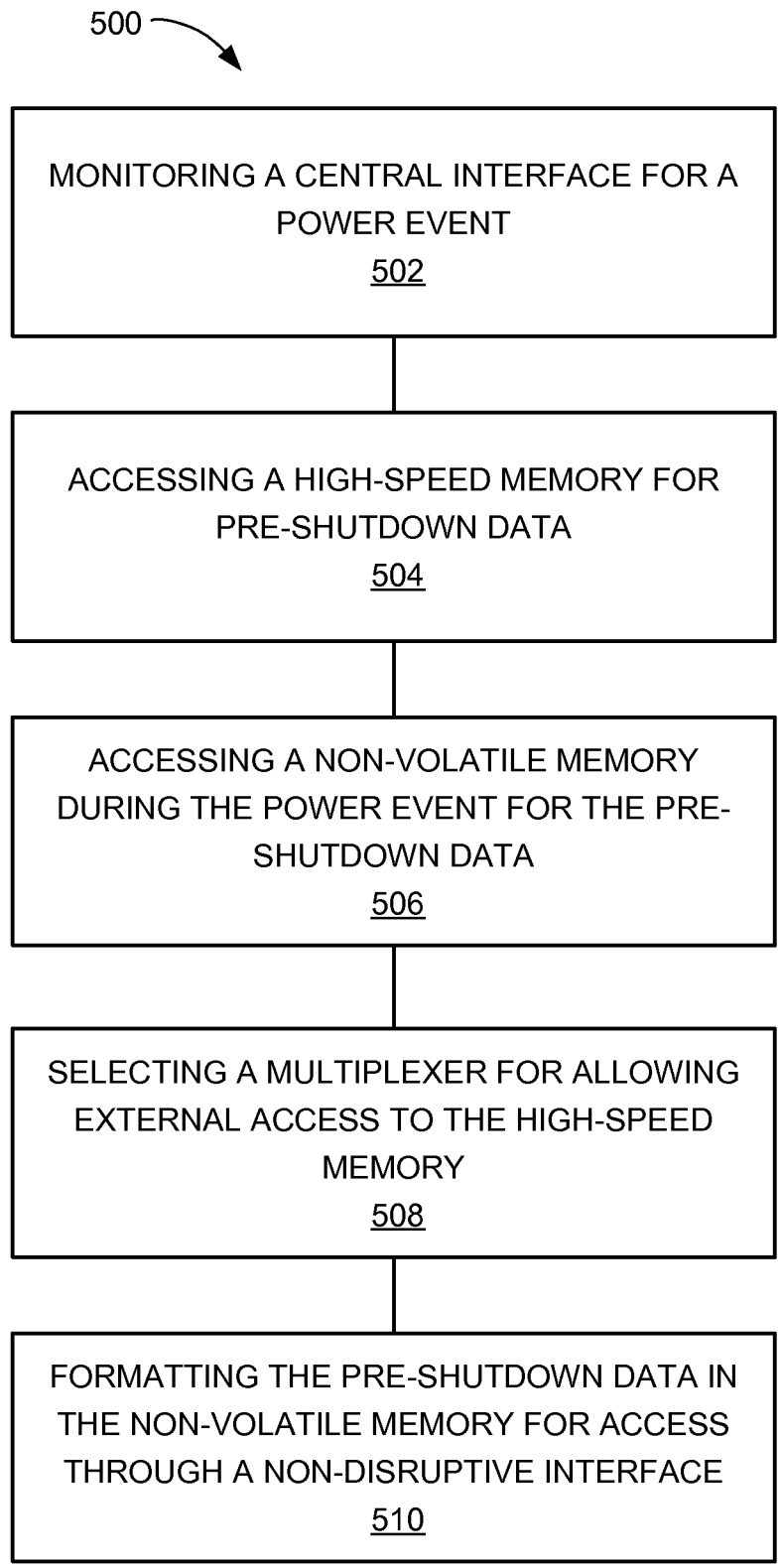
FIG. 5 is a flow chart of a method of operation of the computing system.

Referring now to FIG. 5, therein is shown a flow chart of a method 500 of operation of the computing system 100. The method 500 includes: monitoring a central interface for a power event in a block 502; accessing a high-speed memory for pre-shutdown data in a block 504; accessing a non-volatile memory during the power event for the pre-shutdown data previously stored on the high-speed memory in a block 506; selecting a multiplexer for allowing external access to the high-speed memory in a block 508; and formatting the pre-shutdown data in the non-volatile memory for access through a non-disruptive interface in a block 510.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the memory system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing memory system.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating a computing system comprising:
monitoring a central interface for a power event, wherein monitoring the central interface includes detecting a power-on sequence during system initialization;
training a high-speed volatile memory during the system initialization to determine a fastest write speed of the high-speed volatile memory by performing a series of write and read operations to and from the high-speed volatile memory at predetermined rates and increasing in write speed;
accessing a non-volatile memory during the power event for pre-shutdown data previously stored on the high-speed volatile memory;
selecting a multiplexer for allowing external access to the high-speed volatile memory;
formatting the pre-shutdown data in the non-volatile memory for access through a non-disruptive interface, wherein formatting the pre-shutdown data includes formatting the pre-shutdown data after detecting the power-on sequence; and
transferring the pre-shutdown data from the non-volatile memory to the high-speed volatile memory after the high-speed volatile memory training is finished, the non-volatile memory accessed through the non-disruptive interface, the high-speed volatile memory accessed through an access controller, and the high-speed volatile memory configured for the fastest write speed.

2. The method as claimed in claim 1 wherein:
monitoring the central interface includes detecting a power-off sequence; and
formatting the pre-shutdown data includes preserving the speed of the interface between the non-volatile memory and the high-speed volatile memory after detecting the power-off sequence.

3. The method as claimed in claim 1 further comprising enabling simultaneous access to the non-volatile memory through the non-disruptive interface and to the high-speed volatile memory through the central interface.

4. The method as claimed in claim 1 wherein formatting the pre-shutdown data includes formatting the pre-shutdown data for communicating through a serial advanced technology attachment interface or a universal serial bus interface.

5. The method as claimed in claim 1 further comprising:
transferring the pre-shutdown data from the high-speed volatile memory to the non-volatile memory during a power-off sequence; and
wherein:
selecting the multiplexer includes selecting the multiplexer through the central interface; and
formatting the pre-shutdown data includes formatting the pre-shutdown data for access through the non-disruptive interface during the power-on sequence.

6. The method as claimed in claim 5 wherein accessing the high-speed volatile memory includes reading a double data rate random synchronous dynamic random access memory.

7. The method as claimed in claim 5 wherein accessing the non-volatile memory includes accessing a flash memory.

8. The method as claimed in claim 5 wherein accessing the non-volatile memory includes writing the pre-shutdown data to the non-volatile memory during the power-off sequence.

9. The method as claimed in claim 5 wherein accessing the non-volatile memory includes reading the pre-shutdown data from the non-volatile memory during the power-on sequence.

10. A computing system comprising:
an event detector coupled to a central interface, with the event detector for monitoring the central interface for a power event, wherein monitoring the central interface includes detecting a power-on sequence during system initialization;
a multiplexer, coupled to the central interface, for accessing a high-speed volatile memory through an access controller;
an access controller, coupled to the multiplexer, for accessing the high-speed volatile memory;
a memory controller, coupled to the multiplexer, for accessing a non-volatile memory during the power event for pre-shutdown data previously stored on the high-speed volatile memory, and
the memory controller having:
an on-sequence module for selecting the multiplexer to allow external access to the high-speed volatile memory, for training a high-speed volatile memory during the system initialization to determine a fastest write speed of the high-speed volatile memory by performing a series of write and read operations to and from the high-speed volatile memory at predetermined rates and increasing in write speed, and for transferring the pre-shutdown data from the non-volatile memory to the high-speed volatile memory after the high-speed volatile memory training is finished and with the high-speed volatile memory configured for the fastest write speed; and
a format module for formatting the pre-shutdown data in the non-volatile memory for access through the non-disruptive interface, wherein formatting the pre-shutdown data includes formatting the pre-shutdown data after detecting the power-on sequence.

11. The system as claimed in claim 10 wherein:
the event detector is for detecting a power-off sequence; and
the format module is for preserving the speed of the interface between the non-volatile memory and the high-speed volatile memory after detecting the power-off sequence.

12. The system as claimed in claim 10 wherein the memory controller is for enabling simultaneous access to the non-volatile memory through the non-disruptive interface and to the high-speed volatile memory through the central interface.

13. The system as claimed in claim 10 wherein the format module is for formatting the pre-shutdown data for communicating through a serial advanced technology attachment interface or a universal serial bus interface.

14. The system as claimed in claim 10 further comprising:
an off-sequence module, coupled to the multiplexer, for transferring the pre-shutdown data from the high-speed volatile memory to the non-volatile memory during a power-off sequence; and
wherein:
the format module is for formatting the pre-shutdown data for access through the non-disruptive interface during the power-on sequence.

15. The system as claimed in claim 14 wherein the high-speed volatile memory is a double pre-shutdown data rate random synchronous dynamic random access memory.

16. The system as claimed in claim 14 wherein the non-volatile memory is a flash memory.

17. The system as claimed in claim 14 wherein the off-sequence module is for writing the pre-shutdown data to the non-volatile memory during the power-off sequence.

18. The system as claimed in claim 14 wherein the on-sequence module is for reading the pre-shutdown data from the non-volatile memory during the power-on sequence.

* * * * *